United States Patent
Yoshikawa

(10) Patent No.: US 12,542,625 B2
(45) Date of Patent: Feb. 3, 2026

(54) COMMUNICATION APPARATUS, CONTROL METHOD FOR COMMUNICATION APPARATUS, AND A NON-TRANSITORY COMPUTER-READABLE STORAGE MEDIUM

(71) Applicant: CANON KABUSHIKI KAISHA, Tokyo (JP)

(72) Inventor: Yuki Yoshikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 17/969,753

(22) Filed: Oct. 20, 2022

(65) Prior Publication Data

US 2023/0041149 A1 Feb. 9, 2023

Related U.S. Application Data

(63) Continuation of application No. PCT/JP2021/015022, filed on Apr. 9, 2021.

(30) Foreign Application Priority Data

May 25, 2020 (JP) ................................. 2020-090829

(51) Int. Cl.
*H04L 1/1607* (2023.01)
*H04W 84/12* (2009.01)

(52) U.S. Cl.
CPC .......... *H04L 1/1621* (2013.01); *H04L 1/1642* (2013.01); *H04W 84/12* (2013.01)

(58) Field of Classification Search
CPC ... H04L 1/1621; H04L 1/1642; H04L 1/1685; H04L 1/1864; H04L 1/187; H04L 1/1614;

(Continued)

(56) References Cited

U.S. PATENT DOCUMENTS 10,925,065 B2 * 2/2021 Huang ................. H04L 47/365
11,424,967 B2    8/2022 Yoshikawa
(Continued)

FOREIGN PATENT DOCUMENTS

| CN | 107615793 B   | 4/2020 |
| JP | 2018-050133 A | 3/2018 |
| TW | 201914251 A   | 4/2019 |

OTHER PUBLICATIONS

"IEEE Standard for Information technology, Part 11: Wireless LAN Medium Access Control (MAC) and Physical Layer (PHY) Specifications" IEEE Std. 802.11-2016, IEEE Computer Society, (Dec. 2016), pp. 672-680, 1170, 1416 (Year: 2016).*

(Continued)

*Primary Examiner* — Kathy W Wang-Hurst
*Assistant Examiner* — Garth D Richmond
(74) *Attorney, Agent, or Firm* — Carter, DeLuca & Farrell LLP

(57) ABSTRACT

There is provided a communication apparatus that complies with an IEEE 802.11 series standard, comprising: data transmitting unit for transmitting data frames each including a data unit to an other communication apparatus a plurality of times continuously; generating unit for generating a Block Ack Request (BAR) frame; BAR transmitting unit for transmitting the BAR frame to the other communication apparatus after transmission of the data frames the plurality of times continuously; and receiving unit for receiving a Block Ack (BA) frame as a response to the BAR frame, wherein the generating unit indicates a sequence number for a data unit in an initial data frame using a predetermined field in the BAR frame, and the predetermined field includes a different field from a Starting Sequence Number field in the BAR frame.

3 Claims, 10 Drawing Sheets

(58) Field of Classification Search
CPC ...... H04L 27/26; H04W 28/06; H04W 28/04; H04W 84/12
See application file for complete search history.

(56) References Cited

U.S. PATENT DOCUMENTS

| | | | |
|---|---|---|---|
| 2006/0083233 A1* | 4/2006 | Nishibayashi | H04L 49/90 370/389 |
| 2019/0364555 A1* | 11/2019 | Huang | H04W 72/51 |
| 2021/0297189 A1 | 9/2021 | Yoshikawa | |
| 2021/0368506 A1 | 11/2021 | Yoshikawa | |
| 2021/0384943 A1 | 12/2021 | Yoshikawa | |
| 2022/0158771 A1* | 5/2022 | Pettersson | H04L 1/1816 |
| 2022/0248465 A1 | 8/2022 | Yoshikawa | |
| 2022/0353113 A1 | 11/2022 | Yoshikawa | |
| 2023/0040554 A1* | 2/2023 | Huang | H04L 1/1621 |
| 2023/0097269 A1 | 3/2023 | Yoshikawa | |

OTHER PUBLICATIONS

International Search Report issued by the Japan Patent Office on Jun. 15, 2021 in corresponding International Application No. PCT/JP2021/015022, with English translation.

Notice of Reasons for Refusal issued by the Japanese Patent Office on Jun. 7, 2024 in corresponding JP Patent Application No. 2020-090829, with English translation.

TW Office Action issued in corresponding TW Patent Application No. 110114290, dated Mar. 30, 2023, pp. 1-13, with partial English translation.

"IEEE Standard for Information technology—Telecommunications and information exchange between systems Local and metropolitan area networks- Specific requirements, Part 11: Wireless LAN Medium Access Control (MAC) and Physical Layer (PHY) Specifications" IEEE Std 802.11-2016, IEEE Computer Society, (Dec. 2016) pp. 1-22.

Decision of Refusal issued by the Japanese Patent Office on Oct. 15, 2024 in corresponding JP Patent Application No. 2020-090829, with English translation.

* cited by examiner

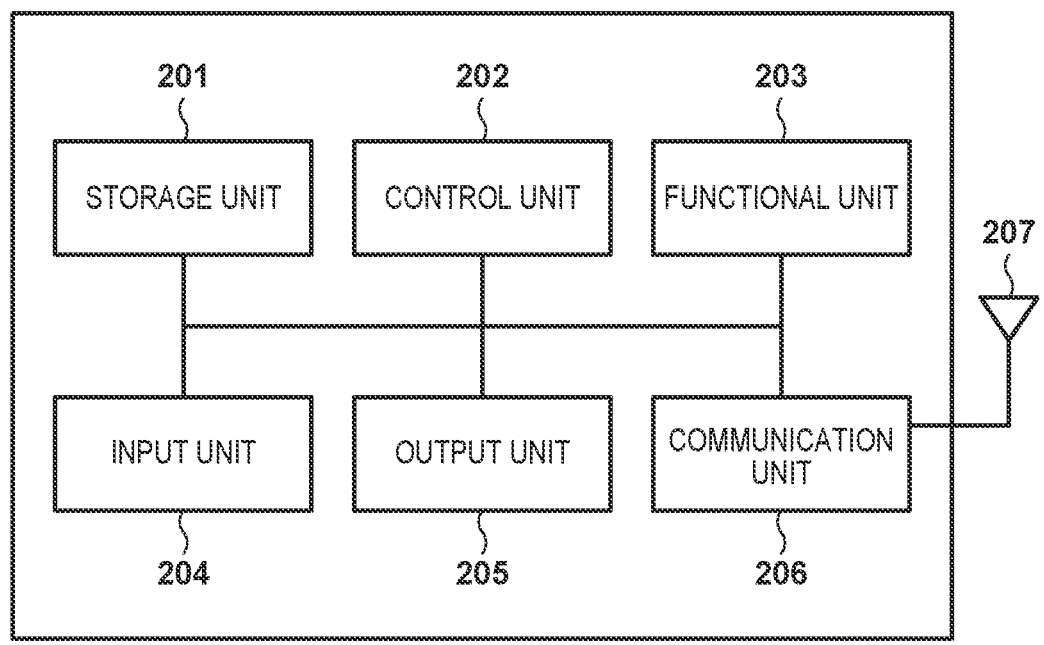
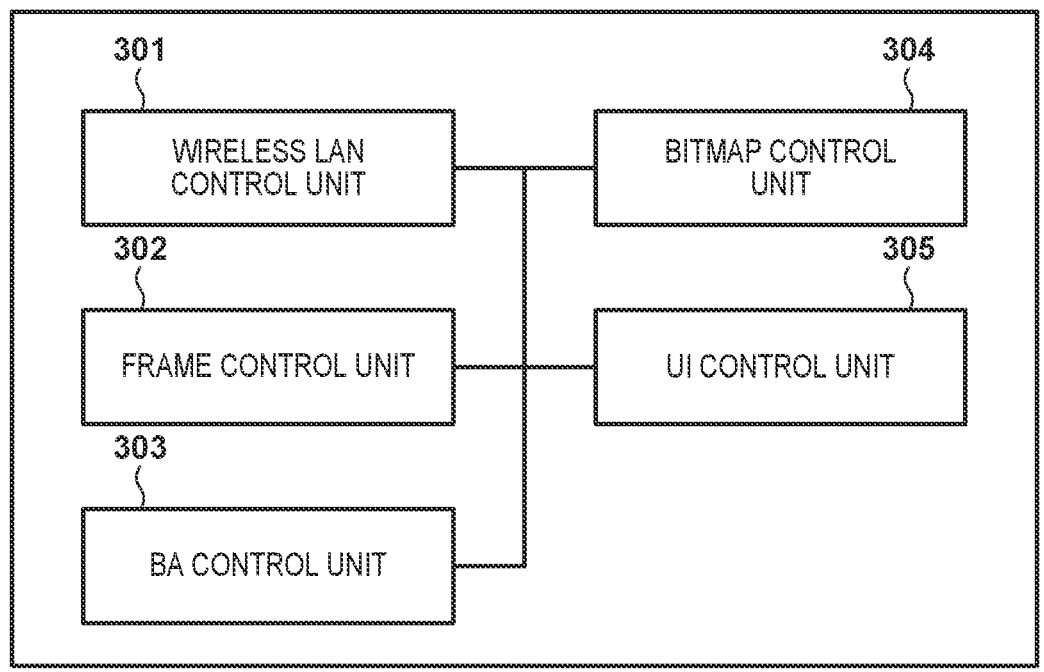

FIG. 11

| BA Type | BlockAck frame variant |
|---|---|
| 0 | Basic |
| 1 | Extended Compressed |
| 2 | Compressed |
| 3 | Multi - TID |
| 4-5 | Reserved |
| 6 | GCR |
| 7-9 | Reserved |
| 10 | GLK - GCR |
| 11 | Multi - STA |
| 12-15 | Reserved |

COMMUNICATION APPARATUS, CONTROL METHOD FOR COMMUNICATION APPARATUS, AND A NON-TRANSITORY COMPUTER-READABLE STORAGE MEDIUM

CROSS-REFERENCE TO RELATED APPLICATIONS

This application is a Continuation of International Patent Application No. PCT/JP 2021/015022, filed Apr. 9, 2021, which claims the benefit of Japanese Patent Application No. 2020-090829 filed May 25, 2020, both of which are hereby incorporated by reference herein in their entirety.

BACKGROUND OF THE INVENTION

Field of the Invention

The present invention relates to a wireless communication technique.

Description of the Related Art

With recent increases in the amount of data communication, development of wireless local area network (LAN) communication techniques has been proceeding. The Institute of Electrical and Electronics Engineers (IEEE) 802.11 series of standards are known as the main standard for wireless LAN. The IEEE 802.11 series of standards includes standards such as IEEE 802.11a/b/g/n/ac/ax, and the like. For example, 802.11ax is a standard for techniques that use orthogonal frequency-division multiple access (OFDMA) to improve the communication speed in a congested state while having a high peak throughput of a maximum of 9.6 gigabits (Gbps) per second (PTL1).

Also, from 802.11n, a method known as Block Ack (BA) is incorporated that responds with a bitmap of which frames the receiving side has received after the transmitting side has transmitted a plurality of frames as one. Ack stands for Acknowledgement. A BA can represent, using a bitmap indicating the sequence number of the initially received data (data frame) and which data has been received from among the data of the following consecutive sequence numbers, which data has been received and which data has not been received for each sequence number of the transmission data. With 802.11n, the sequence number for the data initially received in the BA is 12 bit, and a 128 octet field is prepared for the bitmap. The data receiving side confirms the number of the sequence number of the data received counted from the sequence number of the data initially received. Next, a bit corresponding to the received data is set to 1. The other bits are all set to 0. Consider an example in which the sequence number of the data initially received is 5 and the sequence numbers of the received pieces of data are 5, 6, and 8. The sequence number of the data initially received is 5. The 1st, 2nd, and 4th bits of the bitmap are set to 1. The other bits are all set to 0. In this manner, the transmitting side of the data to receive a BA for can confirm what data the receiving side correctly received. Also, a Block Ack Request (BAR) is prepared as a frame for confirming when a BA should be transmitted to the data receiving side. The data receiving side confirms the sequence number of the received data (data frame) in response to receiving the BAR and responds with a BA.

With such a process, the data transmitting side can transmit the data as one, and as a result, since an overlap in the data transmission is removed, the throughput of the data transmission can be increased.

A task group has been established to work on IEEE 802.11be, the successor standard with the aim of further improving throughput, further enhancing frequency utilization frequency, and further enhancing communication latency. With the IEEE 802.11be standard, a technique for communicating is being investigated in which a single access point (AP) establishes plurality of links with a single station (STA) or terminal apparatus via a plurality of different frequency channels.

CITATION LIST

Patent Literature

PTL1 Japanese Patent Laid-Open No. 2018-50133

With the IEEE 802.11be standard, one method of further improving throughput being investigated includes increasing the number of fields allocated to the bitmap of the BA to allow more data to be transmitted as one. By increasing the amount of data to be transmitted as one, it is plausible that sequence number overlap can be avoided, thus increasing the maximum value able to be represented by a sequence number. At this time, there is a possibility that the sequence number for the data initially received indicated in BA or BAR becomes unable to be represented by only the currently prepared fields.

SUMMARY OF THE INVENTION

In light of the problems described above, the present disclosure provides a technique for expanding the region for sequence numbers indicated by frames for controlling a BA.

To achieve the object described above, a communication apparatus of an aspect of the present invention has the following configuration. That is, a communication apparatus that complies with an IEEE 802.11 series standard, comprising: data transmitting unit configured to transmit data frames each including a data unit to an other communication apparatus a plurality of times continuously; generating unit configured to generate a Block Ack Request (BAR) frame; BAR transmitting unit configured to transmit the BAR frame to the other communication apparatus after transmission of the data frames the plurality of times continuously; and receiving unit configured to receive a Block Ack (BA) frame as a response to the BAR frame from the other communication apparatus, wherein the generating unit indicates a sequence number for a data unit in an initial data frame, from among the data frames transmitted the plurality of times continuously, using a predetermined field in the BAR frame, and the predetermined field includes a different field from a Starting Sequence Number field in the BAR frame.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 2 is a diagram illustrating an example of the hardware configuration of a communication apparatus according to an embodiment.

FIG. 3 is a diagram illustrating an example of the functional configuration of a communication apparatus according to an embodiment.

FIG. 11 is a table illustrating specific examples of BAR Types indicated by a BAR or a BA.

DESCRIPTION OF THE EMBODIMENTS

Figure 1:
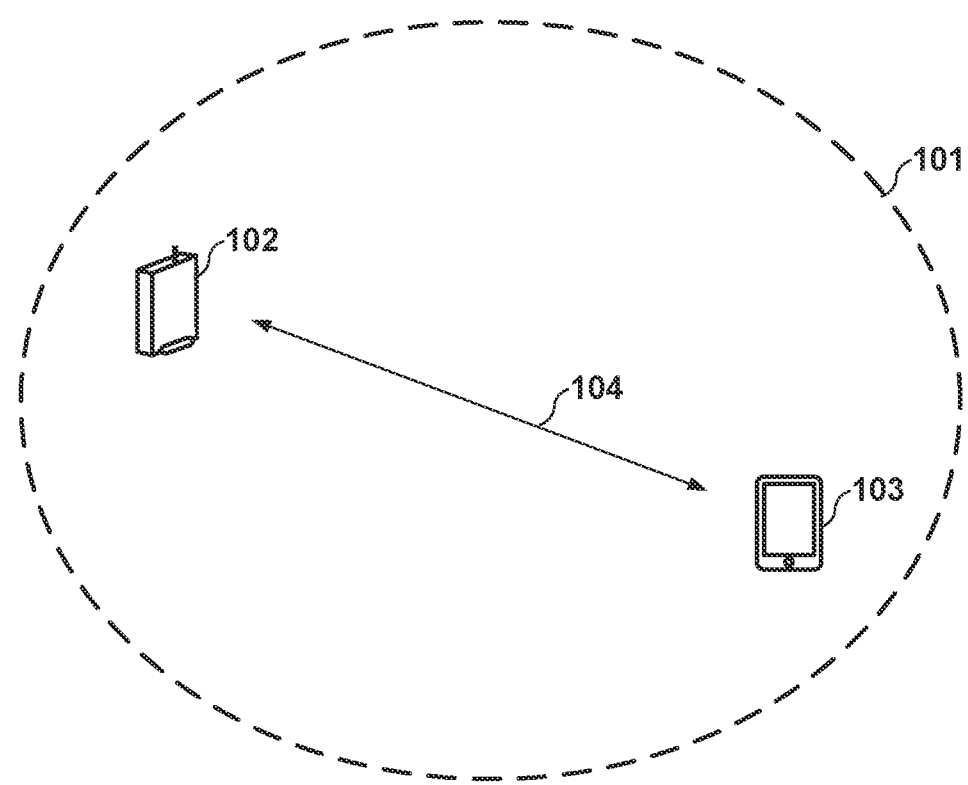
FIG. 1 is a diagram illustrating an example configuration of a wireless communication system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Configuration of Wireless Communication System

FIG. 1 illustrates an example configuration of a wireless communication system according to the present embodiment. FIG. 1 is a diagram illustrating a configuration including, as a communication apparatus, one access point (AP 102) and a station/terminal apparatus (STA 103). As illustrated in FIG. 1, the network formed by the AP 102 is illustrated as a circle 101. The STA 103 is capable of exchanging signals with the AP 102. A link 104 represents a communication link between the AP 102 and the STA 103. Note that the diagram illustrates an example, and the following discussion is applicable to a network including a plurality of communication apparatuses in a wider area and to various positional relationships of the communication apparatuses. Also, in the present embodiment, an AP (AP 102) is used. However, the present invention is not limited to using an AP, and it is sufficient that the communication apparatus has a function like an AP of adjusting a wireless network.

The AP 102 and the STA 103 are capable of performing wireless communication that complies with the IEEE 802.11be (EHT) standard. Note that IEEE is an abbreviation for the Institute of Electrical and Electronics Engineers. The AP 102 and the STA 103 are capable of communicating at frequencies including 2.4 GHz, 5 GHz, and 6 GHz. The frequency band used by the AP 102 and the STA 103 is not limited to these, and, for example, different frequency bands such as 60 GHz may be used. Also, the AP 102 and the STA 103 are capable of communicating using bandwidth of 20 MHz, 40 MHz, 80 MHz, 160 MHz, and 320 MHz. The bandwidth used by the AP 102 and the STA 103 is not limited to these, and, for example, different bandwidths, such as 240 MHz and 4 MHz, may be used.

Note that in this example, the AP 102 and the STA 103 are compatible with the IEEE 802.11be standard, but may also be compatible with a standard prior to the IEEE 802.11be standard. Specifically, the AP 102 and the STA 103 may be compatible with at least one of the IEEE 802.11a/b/g/n/ac/ax standards. Also, in addition to the IEEE 802.11 series of standards, other standards, such as Bluetooth (registered trademark), NFC, UWB, ZigBee, MBOA, and the like may be compatible. Note that UWB is an abbreviation for Ultra Wideband, and MBOA is an abbreviation for Multi Band OFDM Alliance. Also, NFC is an abbreviation for Near Field Communication. UWB includes wireless USB, wireless 1394, WiNET, and the like. Also, the AP 102 and the STA 103 may be compatible with wired communication standards such as wired LAN. Specific examples of the AP 102 include, but are not limited to, a wireless LAN router, a personal computer (PC), and the like. Also, the AP 102 may be an information processing device such as a radio chip capable of performing wireless communication that complies with the IEEE 802.11be standard. Also, specific examples of the STA 103 include, but are not limited to, a camera, a tablet, a smart phone, a PC, a mobile phone, a video camera, and the like. Also, the STA 103 may be an information processing device such as a radio chip capable of performing wireless communication that complies with the IEEE 802.11be standard. Also, as described above, the network in FIG. 1 is configured of a single AP and a single STA. However, the present invention is not limited to this number and arrangement of the AP and STA. For example, the network may be configured of a combination of zero APs and two STAs, two APs and zero STAs, or one AP and 10 STAs. Note that in the examples of the present embodiment described herein, the IEEE 802.11be is used. However, as long as the present invention is applicable to similar techniques, successor standards of the IEEE 802.11 series and other wireless communication standards can be used.

As described above, the AP 102 and the STA 103 are capable of communicating using bandwidth of 20 MHz, 40 MHz, 80 MHz, 160 MHz, and 320 MHz. Also, the AP 102 and the STA 103 may perform Multi-Link communication by communicating with links established via a plurality of frequency channels. In the IEEE 802.11 series of standards, the bandwidth of each frequency channel is defined as 20 MHz. Here, frequency channel is a frequency channel defined by the IEEE 802.11 series of standards and indicates the frequency channel able to be used to perform wireless communication that complies with the IEEE 802.11 series standard. In the IEEE 802.11 series standard, a plurality of frequency channels are defined in each frequency band including 2.4 GHz, 5 GHz, and 6 GHz. Note that with a single frequency channel, a bandwidth of 40 MHz or greater may be used via the channel bonding of adjacent frequency channels. For example, the AP 102 is capable of establishing, with the STA 103, a first link via a first frequency channel of the 2.4 GHz band and a second link via a second frequency channel of the 5 GHz band and performing communicating via both links. In this case, the AP 102 performs Multi-Link communication in which the second link via the second frequency channel is maintained in parallel with the first link via the first frequency channel. In this manner, by the AP 102 establishing links via a plurality of frequency channels with the STA 103, the throughput of the communication with the STA 103 can be improved. In Multi-Link, two or more links are established in this manner. However, in the present embodiment, for brevity, the only link between the AP 102 and the STA 103 is the link 104.

When data is communicated between the AP 102 and the STA 103, the AP 102 and the STA 103 use a data frame including a data unit. Also, to confirm which data has been received, a Block Ack (BA) frame and a Block Ack Request (BAR) frame are used. Note that hereinafter, the BA frame and the BAR frame are abbreviated to BA and BAR, respectively. BA is a frame indicating which data frame has been received from among a plurality of data frames (data units) received from the transmitting side by the receiving side. Also, BAR is a frame for confirming when a BA should be transmitted to the receiving side of the data frame (data unit). By using a BAR and a BA, the data transmitting side can transmit the data as one, which allows overhead involving frame transmission confirmation to be reduced.

Also, the AP 102 and the STA 103 may be capable of performing Multiple-Input And Multiple-Output (MIMO) communication. In this case, the AP 102 and the STA 103 each include a plurality of antennas, with different signals being sent from the antennas by the transmitting side using the same frequency channel. The receiving side simultaneously receives all of the signals that arrived from the plurality of streams using the antennas, separates the signals of the streams, and decodes them. In this manner, by performing MIMO communication, the AP 102 and the STA 103 can communicate a larger amount of data in the same amount of time compared to a case where MIMO communication is not performed. Also, the AP 102 and the STA 103, in a case where Multi-Link communication is performed, may perform MIMO communication at one or more links.

The AP 102 and the STA 103 are capable of performing OFDMA communication that complies with the IEEE 802.11be standard. For example, the AP 102 can implement Multi-User (MU) communication in which signals addressed to multiple users (STA) are multiplexed. In OFDMA communication, a portion (resource unit (RU)) of the divided frequency band is allocated to each STA without overlap, and the carrier waves to each STA are orthogonal to one another. Thus, when there are a plurality of STAs present, the AP 102 is capable of communicating in parallel with the plurality of STAs in a specified bandwidth.

In the IEEE 802.11ax, the data transfer method from the STA to the AP using OFDMA is specified. An example will now be described. When there are a plurality of STAs present, first, the AP confirms with each STA whether or not there is data to be transmitted. The frame used for confirmation at this time is referred to as a Buffer Status Report (BSR) Request. In response to this, each STA communicates to the AP the amount of data projected to be transmitted to the AP. The frame used for communicating at this time includes a Buffer Status Report (BSR). Note that the method here is an example, and other methods may be used to communicate a BSR to the AP. For example, each STA may transmit a data frame or a control frame including a BSR to the AP. The AP allocates the STAs to subchannels on the basis of the BSRs received from each STA and transmits a frame corresponding to the data transmission starting point. The frame which is the starting point is referred to as a trigger frame. The trigger frame includes information of which subchannel each STA should use to transmit data and information of the secured period of time. The STA transmits data to the AP on the basis of the trigger frame information.

Thus, even when there are a plurality of STAs present and the environment is congested, the STA can transmit data while avoiding collisions.

Configuration of AP and STA

FIG. 2 is a diagram illustrating an example of the hardware configuration of the AP 102 according to the present embodiment. Note that the STA 103 has a similar hardware configuration to the AP 102, and here only the AP 102 will be described. The AP 102, as an example of the hardware configuration, includes a storage unit 201, a control unit 202, a functional unit 203, an input unit 204, an output unit 205, a communication unit 206, and an antenna 207. Note that a plurality of antennas 207 may be provided.

The storage unit 201 is constituted by one or more memory, such as a ROM or a RAM, and stores computer programs for executing various operations described below and stores various pieces of information such as communication parameters for wireless communication. ROM is an abbreviation for Read Only Memory, and RAM is an abbreviation for Random Access Memory. Note that, other than a ROM, RAM, or other such memory, a storage medium, such as a flexible disk, a hard disk, an optical disk, a magneto-optical disk, a CD-ROM, a CD-R, a magnetic tape, a non-volatile memory card, a DVD, or the like, may be used as the storage unit 201. Also, the storage unit 201 may be provided with a plurality of memory devices.

The control unit 202, for example, is constituted by one or more processors, such as a CPU, an MPU, or the like, and completely controls the AP 102 by executing computer programs stored in the storage unit 201. Note that the control unit 202 may completely control the AP 102 via cooperation of the computer program stored on the storage unit 201 and an OS. Also, the control unit 202 generates data and signals (radio frame) for transmission via communication with other communication apparatuses. Note that CPU is an abbreviation for central processing unit, and MPU is an abbreviation for micro processing unit. Also, the control unit 202 may be provided with a plurality of processors such as a multicore processor and completely control the AP 102 via the plurality of processors.

Also, the control unit 202 controls the functional unit 203 and executes predetermined processing, such as wireless communication, image capture, printing, projecting, and the like. The functional unit 203 is hardware for the AP 102 to execute predetermined processing.

The input unit 204 receives various operations from a user. The output unit 205 outputs to a user via a monitor screen or a speaker, for example. In this example, output via the output unit 205 may correspond to displaying on a monitor screen, outputting audio via a speaker, outputting vibrations, and the like. Note that the input unit 204 and the output unit 205 may be implemented as a single module via a touch panel, for example. Also, the input unit 204 and the output unit 205 may be integrally formed with each AP 102 or may be a separately formed.

The communication unit 206 executes control of wireless communication that complies with the IEEE 802.11be standard. Also, the communication unit 206 may execute control of wireless communication that complies with another IEEE 802.11 series standard in addition to the IEEE 802.11be standard and may execute control of wired communication using a wired LAN or the like. The communication unit 206 controls the antenna 207 and transmits and receives signals for wireless communication generated by the control unit 202.

Note that in a case where the AP 102, in addition to the IEEE 802.11be standard, is compatible with an NFC standard, Bluetooth standard, or the like, the AP 102 may execute control of wireless communication that complies with these communication standards. Also, in a case where the AP 102 is capable of wireless communication that complies with a plurality of communication standards, a configuration may be used in which the communication unit compatible with the communication standards and the antennas are provided separate. The AP 102 communicates data, such as image data, document data, video data, and the like, to the STA 103 via the communication unit 206. Note that the antenna 207 may be separately formed from the communication unit 206 or may be formed as a single module together with the communication unit 206.

The antenna 207 is an antenna capable of communication at a frequency band including 2.4 GHz, 5 GHz, and 6 GHz. In the present embodiment, the AP 102 includes one antenna, but three antennas may be provided. Also, a different antenna may be provided for each frequency band. Furthermore, in a case where the AP 102 includes a plurality of antennas, the communication unit 206 may be provided corresponding to each antenna.

FIG. 3 is a diagram illustrating an example of the functional configuration of the AP 102 according to the present embodiment. Note that here also, the STA 103 has a similar functional configuration to the AP 102, and only the AP 102 will be described. The AP 102, as an example of the functional configuration, includes a wireless LAN control unit 301, a frame control unit 302, a BA control unit 303, a bitmap control unit 304, and a UI control unit 305.

The wireless LAN control unit 301 includes an antenna and a circuit for transmitting and receiving radio frames (radio signals) with other wireless LAN apparatuses and a program for controlling these. The wireless LAN control unit 301 executes wireless LAN communication control on the basis of a frame generated by the frame control unit 302 in compliance with the IEEE 802.11 series standard. The wireless LAN control unit 301 also has a timekeeping function. Note that the number of wireless LAN control units is not limited to one and may be two or more.

The frame control unit 302 generates a radio frame to be transmitted by the wireless LAN control unit 301 or analyzes a received radio frame. The contents of the generated radio frame may be restricted by the settings stored in the storage unit 201. Also, the generated radio frame may be changed from the UI control unit 305 via user settings.

The BA control unit 303 sets and confirms the format (corresponding to BAR Type described below) of the BA. The BA control unit 303 may set the format of the BA using a discretionary method. For example, the BA control unit 303 may set the format of the BA on the basis of the radio frame received via the wireless LAN control unit 301. Also, the BA format may be set by the AP 102 or may be input by a user via the input unit 204.

When the frame control unit 302 receives a data frame, the bitmap control unit 304 confirms the sequence number at that time and generates a bitmap indicating which data unit has been received.

The UI control unit 305 includes hardware relating to a user interface, such as a touch panel or button, for accepting operations of the AP by a user of the not-illustrated AP and a program for controlling the hardware. Note that the UI control unit 305 has a function of presenting information to a user via displaying images, outputting audio, and the like.

Processing Flow

Figure 6:
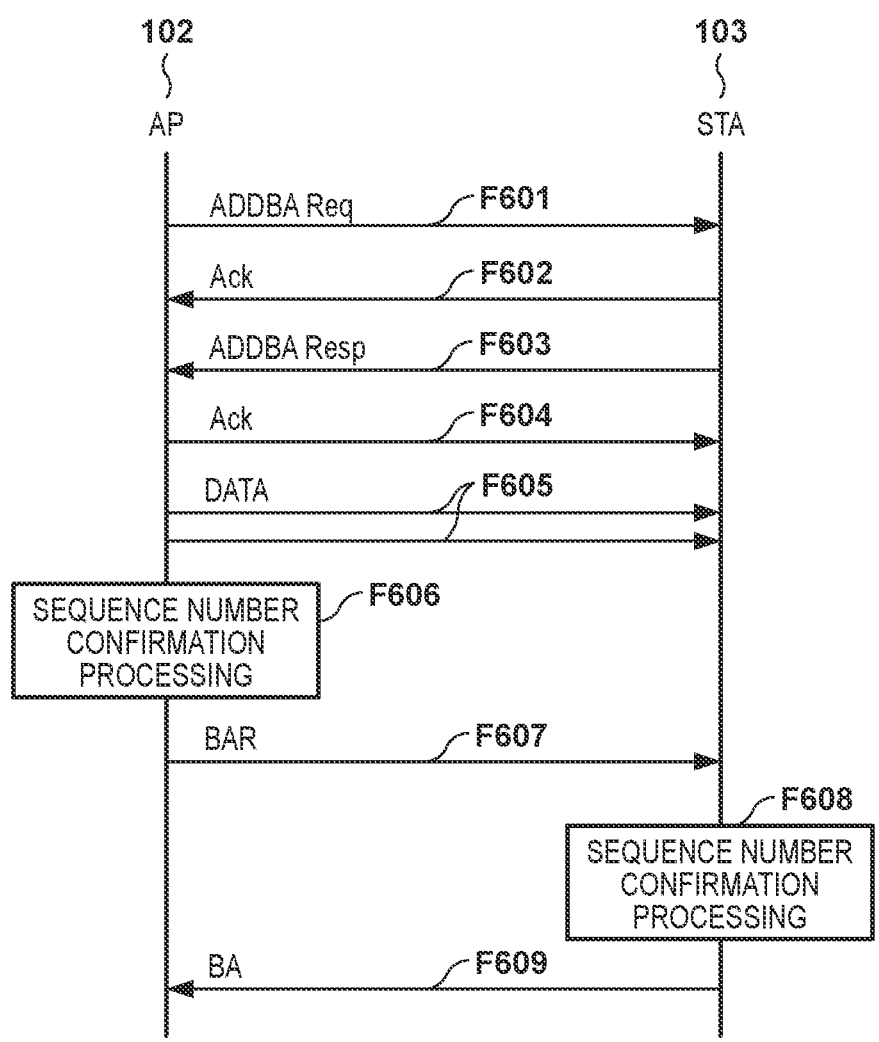
FIG. 6 is a sequence diagram illustrating the flow of data exchange.

Next, the flow of the processing relating to data exchange between the AP 102 and the STA 103 will be described. FIG. 6 is a diagram illustrating the flow of data exchange in the present embodiment. In the present embodiment, data is illustrated as being transmitted from the AP 102 to the STA 103, but this may be reversed, with the data being transmitted from the STA 103 to the AP 102. Note that in the present embodiment, OFDM is used as the communication method, and the transmission of the data frame may be controlled by Enhanced Distributed Channel Access (EDCA).

When data is communicated between the AP 102 and the STA 103, the AP 102 and the STA 103 use a data frame. Also, to confirm which data has been received, a BAR and a BA are used. By using a BAR and a BA, the data transmitting side can transmit the data as one, which allows overhead involving frame transmission confirmation to be reduced. Whether or not to use a BAR and the format of how the BA is transmitted and received is determined by an Add Block Acknowledgement (ADDBA) Request frame and an ADDBA Response frame that are transmitted and received before the data frame is transmitted and a value indicated by the data frame to be transmitted. Note that hereinafter, the ADDBA Request frame is abbreviated to ADDBA Request, and the ADDBA Response frame is abbreviated to ADDBA Response.

The AP 102 transmits to the STA 103 an ADDBA Request as part of preparation for data transmission (F601). Note that the ADDBA request may be transmitted from the STA 103 to the AP 102.

Figure 7:
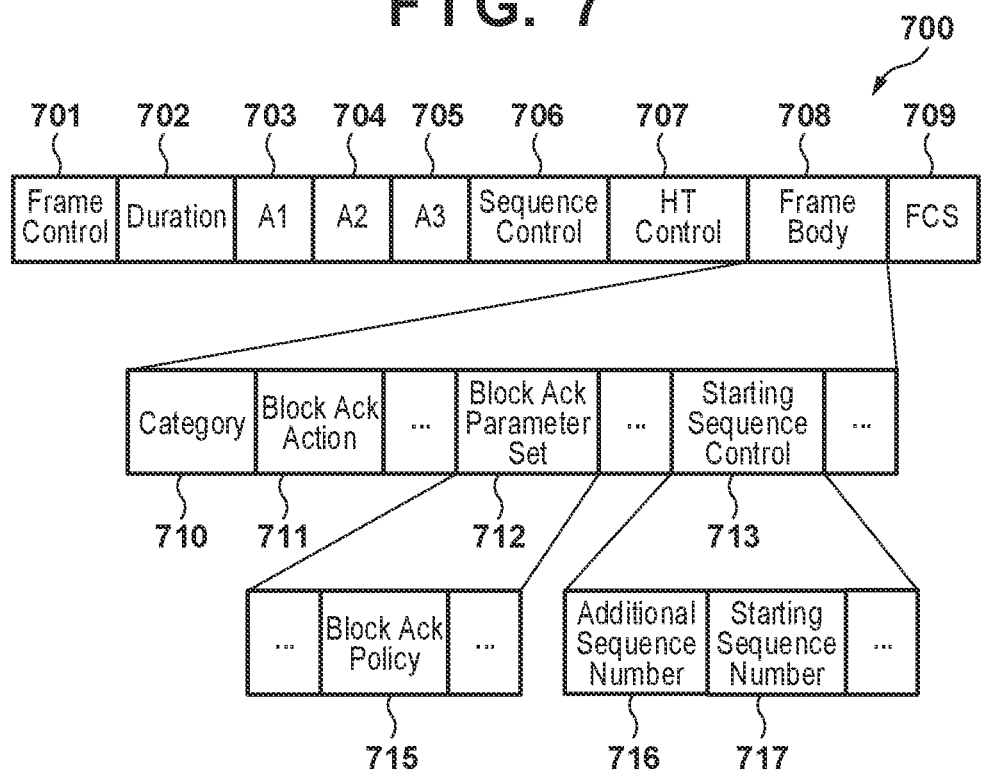
FIG. 7 is a diagram illustrating an example of an ADDBA Request frame.

An example of an ADDBA Request, ADDBA Request 700, is illustrated in FIG. 7. The fields and subfields in the ADDBA Request 700 comply with the format specified in the IEEE 802.11ax. That is, included are, from the front, a Frame Control field 701, a Duration field 702, an A1 field 703, an A2 field 704, an A3 field 705, a Sequence Control field 706, a HT control field 707, a Frame Body field 708, and an FCS field 709. The frame body field 708 includes a category subfield 710, a Block Ack Action subfield 711, a Block Ack Parameter Set subfield 712, and a Starting Sequence Control subfield 713. The Category subfield 710 indicates a value 3 indicating that the frame is a Block Ack Action frame indicating either the start or the end of the Block Ack. The Block Ack Action subfield 711 indicates a value 0 indicating that the frame is an ADDBA Request. The Block Ack Parameter Set subfield 712 includes a Block Ack Policy subfield 715. The Block Ack Policy subfield 715 is a field for determining the format of the Block Ack. When the value of the Block Ack Policy subfield 715 is 1, the format corresponds to an Immediate Block Ack format. When the format is an Immediate Block Ack format, the data transmitting side transmits the data frame and the BAR within the period of time prepared for data transmission. The data receiving side responds to the BAR with a BA. Alternatively, when the value of the Block Ack Policy subfield 715 is 0, the format corresponds to a Delayed Block Ack format. When the format is a Delayed Block Ack format, the data transmitting side transmits the data frame and the BAR within the period of time prepared for data transmission. The data receiving side responds to the BAR with an Ack. The data receiving side once more acquires data frame transmission authorization and transmits a BA, and the data transmitting side responds to the BA with an Ack. With the Immediate Block Ack format, an BA can be performed before data frame transmission confirmation during a single transmission period. Thus, overhead involving data transmission can be reduced. On the other hand, with the Delayed Block Ack format, processing of the Block Ack is no longer needed to be executed in a short period of time. Thus, the difficulty of implementation can be decreased. In the present embodiment, the Immediate Block Ack format is used. However, the present embodiment can be applied using the Delayed Block Ack format.

The Starting Sequence Control subfield 713 includes an Additional Sequence Number subfield 716 and a Starting Sequence Number subfield 717. These two subfields are fields allocated for the sequence number and indicate the sequence numbers (sequence number for the data unit) of the next data frame to be transmitted. Note that the Additional Sequence Number subfield 716 is defined as a Fragment Number subfield with a 4-bit length prior to IEEE 802.11ax. Note that the Fragment Number subfield is a not a field allocated for indicating the sequence numbers, and this also applies to the descriptions hereinafter. The Starting Sequence Number subfield 717 represents the 1st to 12th digits, and the Additional Sequence Number subfield 716 represents the 13th to 16th digits. Using this display format, the 1st to 12th digits of the sequence number can be identified even with a pre-IEEE 802.11ax identification method. Note that a different display format may be used. For example, 4 bits may be prepared for the Fragment Number subfield, and 16 bits may be prepared for the following Starting Sequence Number subfield 717. In this case, even if preparing 4 bits for 0 for the Fragment Number is required, the frame can be compatible. Alternatively, in the Additional Sequence Number subfield 716, the 1st to 4th digits may be displayed, and in the Starting Sequence Number subfield 717, the 5th to 16th digits may be displayed. In this manner, since there is no discontinuity in the number of digits of the sequence numbers, the amount of calculations performed by the frame receiving side when analyzing the sequence numbers can be reduced. Also, the value of the Block Ack Action subfield 711 for the display format may be separately prepared. For example, when the value of the Block Ack Action subfield 711 is 3, this indicates an Extended ADDBA Request, and the bits for the Starting Sequence Number subfield 717 may be set to 16. In other words, the field length of the Starting Sequence Number subfield 717 changes (is variable) depending on the value of the Block Ack Action subfield 711. In this case, since the format of the ADDBA specified by IEEE 802.11ax does not change, implementing the device (communication apparatus) is made easy, which is an advantage. With simpler device implementation, the calculation cost in the device is decreased, which leads to power saving.

Also, as described above, the Additional Sequence Number subfield 716 is 4 bit but it not limited thereto. For example, 2 bits may be allocated to the Fragment Number subfield, and 2 bits may be allocated to the Additional Sequence Number subfield 716. Alternatively, for example, the Starting Sequence Number subfield 717 prepared as an Extended ADDBA Request may be set to 20 bits.

Also, the number of digits of the Starting Sequence Number subfield 717 may change depending on the value indicated by the Additional Sequence Number subfield 716. For example, when the 1st bit of the Additional Sequence Number subfield 716 is 1 and the 2nd to 4th bits are 0, the number of digits of the Starting Sequence Number subfield 717 may be set to 16 digits. Alternatively, whether or not the 1st bit of the Additional Sequence Number subfield 716 is 1 may be used as the determination criteria. Accordingly, even when there is a subsequent change to the Starting Sequence Number subfield 717, the system configuration can be made able to handle the change. When it is determined that the frame is subsequent to IEEE 802.11be in the PHY layer, the number of digits of the Starting Sequence Number subfield may be set to 16 digits. This is also considered to have a similar advantage to changing depending on the value of the Additional Sequence Number.

Figure 8:
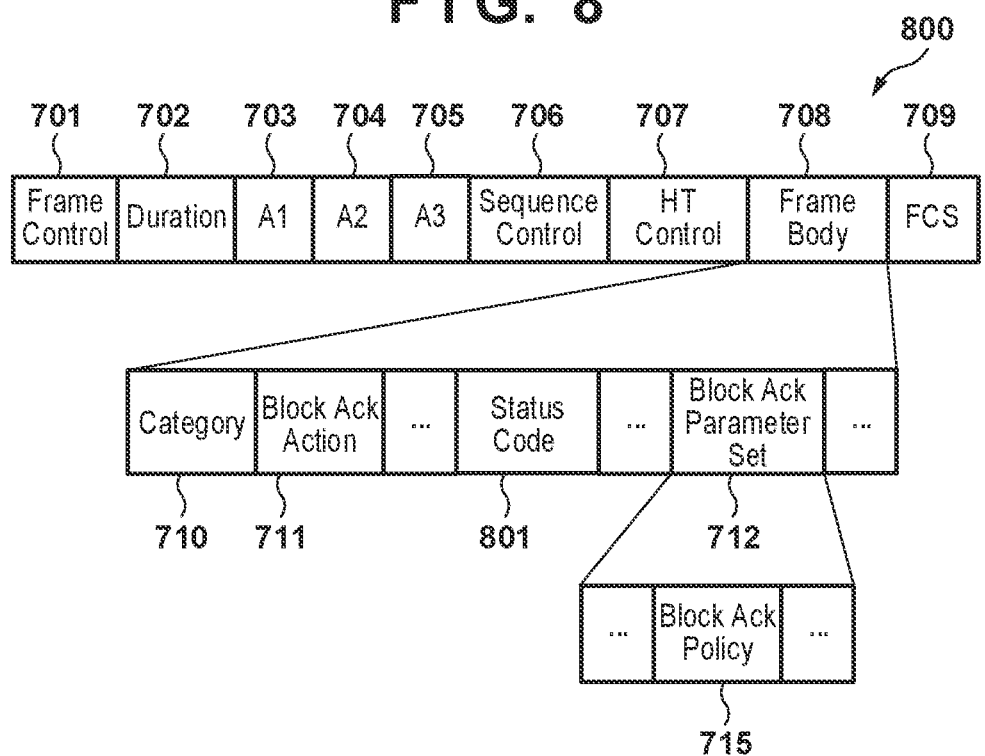
FIG. 8 is a diagram illustrating an example of a ADDBA Response frame.

The STA 103 having received an ADDBA Request with a configuration such as that illustrated in FIG. 7 responds with an Ack (F602). Then, the STA 103 transmits an ADDBA Response (F603). As an example of an ADDBA Response, an ADDBA Response 800 is illustrated in FIG. 8. In the ADDBA Response 800, the fields and subfields 701 to 710 are similar to those in the ADDBA Request 700 illustrated in FIG. 7, and thus description thereof is omitted. The value of the Block Ack Action subfield 711 indicates 1. The configuration of the subsequent subfields is different from that in the ADDBA Request 700. The ADDBA Response 800 includes a Status Code subfield 801. When the value of the Status Code subfield 801 is 0, this indicates Success and means that the ADDBA Request transmitted by the AP 102 has been received. When the value of the Status Code subfield 801 is a value other than 0, this indicates Failure and means that the ADDBA Request transmitted by the AP 102 has been rejected. The Block Ack Parameter Set subfield 712 is similar to that in the ADDBA Request 700, and so a description thereof is omitted. However, in the Block Ack Policy subfield 715, the value indicated is that same value of the field of the received ADDBA Request. In other words, in the present embodiment, the STA 103 responds with Success to the Immediate Block Ack format.

The AP 102 having received an ADDBA Response with a configuration such as that illustrated in FIG. 8 responds with an Ack (F604). The processing up until here is executed prior to data transmission, and after the processing is completed, Delete Block Acknowledgement (DELBA) processing may be executed or data transmission and BA transmission processing may be repeated until the connection is cut.

Thereafter, the AP 102 performs data transmission with the STA 103 (F605). The AP 102 transmits a data frame including a data unit a plurality of times. In the present embodiment, the data frame transmitted at this time has a configuration that complies with IEEE 802.11ax. The QoS Control field of the data frame (not illustrated) includes an Ack Policy subfield. This is located at the 5th and 6th bit of the QoS Control field. In the present embodiment, a BA is transmitted after a BAR, and 1 may be set for both the 5th and 6th bit. Note that, the present embodiment may have a configuration in which, by setting 0 for both the 5th and 6th bit, the data receiving side transmits a BA immediately after the data frame. In this case, overhead involving a BAR is reduced, but it becomes necessary for the device receiving the data to respond with a BA in a short amount of time, thus increasing the complexity of implementation. Note that in the data frame, the frames other than those described above may have a different format.

Figure 9:
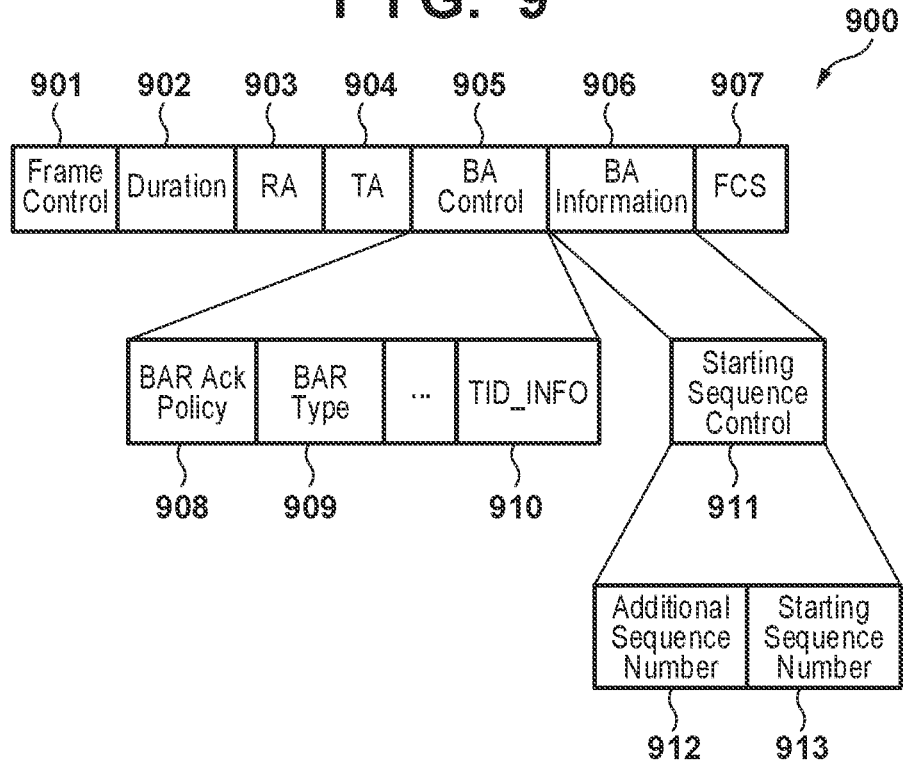
FIG. 9 is a diagram illustrating an example of a BAR frame.

The AP 102 having transmitted data confirms the sequence number of the data unit in the transmitted data frame (F606) and transmits a BAR (F607). As an example of the BAR transmitted here, a BAR 900 is illustrated in FIG. 9. The fields and subfields illustrated in FIG. 9 comply with the format specified in the IEEE 802.11ax. That is, the BAR 900 includes, from the front, a Frame Control field 901, a Duration field 902, an RA field 903, a TA field 904, a BA control field 905, a BA Information field 906, and an FCS field 907. The BA Control field 905 includes a BAR Ack Policy subfield 908, a BAR Type subfield 909, and a TID INFO subfield 910.

The BAR Ack Policy subfield 908 is a field allocated with 1 bit. When the value is 0, the device that has received a BAR responds with a BA, and when the value is 1, the device that has received a BAR does not respond with a BA.

In the present embodiment, the value of the BAR Ack Policy subfield 908 is 0. Note that the present embodiment can still be applied in a case in which the value of the BAR Ack Policy subfield 908 is 1. By not responding with a BA, overhead involving a BA can be reduced. In cases in which it can be reliably confirmed that data has been transmitted, using a BA is effective.

The BAR Type subfield 909 is a subfield indicating the type of BAR. Depending on the value, the value of the BA Information field 906 changes. An example of the values of the BAR Type is illustrated in FIG. 11. In the present embodiment, the value of the BAR Type is 0 (Basic). Note that a different value may be used. For example, the present embodiment may be applied to a case in which the value of the BAR Type is 3 (Multi-TID) and a response of a BA is requested in response to a plurality of TIDs. However, in this case, the subfields included in the following BA Information field 906 may be different to that illustrated in FIG. 9. Also, the subfields indicated by the BA described below may be different.

When the value of the BAR Type is 0 as in the example of the present embodiment, the BA Information field 906 includes a Starting Sequence Control subfield 911. The Starting Sequence Control subfield 911 includes an Additional Sequence Number subfield 912 and a Starting Sequence Number subfield 913. These two subfields are fields allocated for the sequence number. Note that the Additional Sequence Number subfield 912 uses a section is defined as a Fragment Number subfield with a 4-bit length prior to IEEE 802.11ax. The Additional Sequence Number subfield 912 and the Starting Sequence Number subfield 913 indicate the sequence number of the data unit initially responding with a BA. The Starting Sequence Number subfield 913 indicate the 1st to 12th digits, and the Additional Sequence Number subfield indicates the 13th to 16th digits. Using this display format, the 1st to 12th digits of the sequence number can be identified even with a pre-IEEE 802.11ax identification method. Note that a different display format may be used. For example, 4 bits may be prepared for the Fragment Number subfield, and 16 bits may be prepared for the following Starting Sequence Number subfield 913. In this case, even if preparing 4 bits for 0 for the Fragment Number is required, the frame can be compatible. Alternatively, in the Additional Sequence Number subfield 912, the 1st to 4th digits may be displayed, and in the Starting Sequence Number subfield 913, the 5th to 16th digits may be displayed. In this manner, since there is no discontinuity in the number of digits of the sequence numbers, the amount of calculations performed by the frame receiving side when analyzing the sequence numbers can be reduced. Also, the value of the BAR Type for the display format may be separately prepared. For example, when the value of the BAR Type subfield 909 is 4, this indicates an Extended BAR, and the bits for the Starting Sequence Number subfield 913 may be defined as 16. In other words, the field length of the Starting Sequence Number subfield 913 changes depending on the value of the BAR Type subfield 909. In this case, since the format of the ADDBA specified by IEEE 802.11ax does not change, implementing the device is made easy, which is an advantage. With simpler device implementation, the calculation cost in the device is decreased, which leads to power saving.

Also, as described above, the Additional Sequence Number subfield 912 is 4 bit but it not limited thereto. For example, 2 bits may be set for the Fragment Number subfield, and 2 bits may be set for the Additional Sequence Number subfield 912. Alternatively, for example, the Starting Sequence Number subfield 913 prepared as an Extended ADDBA Request may be set to 20 bits.

Also, the number of digits (field length) of the Starting Sequence Number subfield 913 may change depending on the value indicated by the Additional Sequence Number subfield 912 (or instead of this, the Fragment Number subfield). For example, when the 1st bit of the Additional Sequence Number subfield 912 is 1 and the 2nd to 4th bits are 0, the number of digits of the Starting Sequence Number subfield 913 may be set to 16 digits. Alternatively, whether or not the 1st bit of the Additional Sequence Number subfield 912 is 1 may be used as the determination criteria. Accordingly, even when there is a subsequent change to the Starting Sequence Number subfield 913, the system configuration can be made able to handle the change. When it is determined that the frame is subsequent to IEEE 802.11be in the PHY layer, the number of digits of the Starting Sequence Number subfield may be set to 16 digits. This is also considered to have a similar advantage to changing depending on the value of the Additional Sequence Number.

When the value of the BAR Type is 1, 2, 11, the BA Information field 906 is as described above. When the value of the BAR Type of 3, a Starting Sequence Control subfield is attached to the BA Information field 906 for each TID. Specifically, for each TID, a Per TID Info subfield indicating which TID it corresponds to and a Starting Sequence Control subfield are prepared. The display method of the Starting Sequence Control subfield is as described above, and thus a description thereof is omitted.

When the value of the BAR Type is 6 or 10, the BA Information field 906 includes a Starting Sequence Control subfield and a GCR Group Address subfield indicating the group address for requesting the reception status. The display method of the Starting Sequence Control subfield is as described above, and thus a description thereof is omitted.

Figure 10:
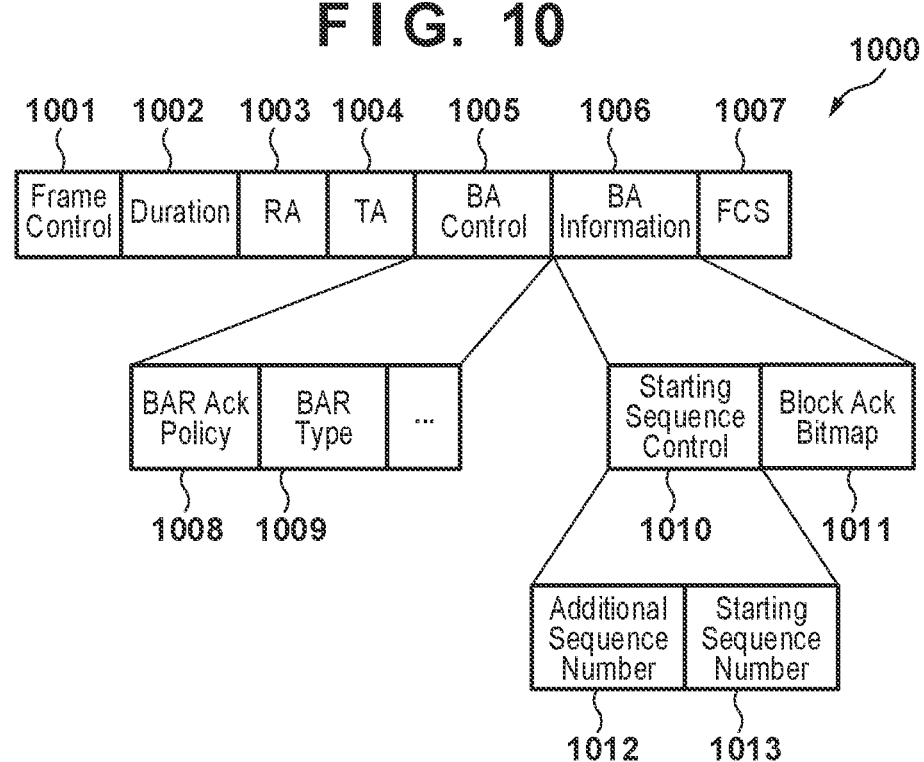
FIG. 10 is a diagram illustrating an example of a BA frame.

The STA 103 having received the BAR confirms the sequence number of the received data unit (F608) and responds with a BA (F609). As an example of the BA transmitted at this time, a BAR 1000 is illustrated in FIG. 10. The fields and subfields illustrated in FIG. 10 comply with the format specified in the IEEE 802.11ax. Fields and subfields 1001 to 1009 illustrated in FIG. 10 are similar to those of BAR 900 (FIG. 9), and thus descriptions thereof are omitted. However, the BAR Ack Policy subfield 1008 and the BAR Type subfield 1009 indicate the same values as in the BAR 900. When the value of the BAR Type in the BAR Type subfield 1009 is 0, the BA Information field 1006 includes a Starting Sequence Control subfield 1010 and a Block Ack Bitmap subfield 1011. The Starting Sequence Control subfield 1010 is similar to that in the BAR 900, and thus a description thereof is omitted.

In the Block Ack Bitmap subfield 1011, the number of the sequence number of the received data unit counted relative from the sequence number indicated in the Starting Sequence Control subfield 911 of the BAR 900 is associated with a bit and represented. For example, when the sequence number indicated in the Starting Sequence Control subfield 911 is 3 and the sequence number of the received data unit is 3, 5, 6, the value of the 1st, 3rd, and 4th bit is 1, with the remainder being 0. Accordingly, the AP 102 having received a BA can determine what data unit the STA 103 received and what data unit has not been received. In the Block Ack Bitmap subfield 1011, a 128 octet is prepared. The value is not limited to this value. For example, a 256 octet may be used.

When the value of the BAR Type is 2, in the BA Information field 1006, the Starting Sequence Control subfield 1010 and the Block Ack Bitmap subfield 1011 are prepared. These are a 2 octet and an 8 octet. The value indicated in these subfields are as described above, and thus description thereof is omitted. However, the data indicated here is limited to the same data unit as the TID indicated in the TID INFO subfield 910 of the BAR.

When the value of the BAR Type is 3, in the BA Information field 1006, for each TID indicated, the Per TID Info subfield, the Starting Sequence Control subfield 1010 and the Block Ack Bitmap subfield 1011 are prepared. The Per TID Info subfield indicates which TID the sequence number indicated in the following subfield corresponds to. The Starting Sequence Control subfield 1010 and the Block Ack Bitmap subfield 1011 are as described above, and thus description thereof is omitted.

When the value of the BAR Type is 1, the BA Information field 1006 includes the Starting Sequence Control subfield 1010 and the Block Ack Bitmap subfield 1011, and a RBUFCAP subfield. The Starting Sequence Control subfield 1010 and the Block Ack Bitmap subfield 1011 are as described above, and thus description thereof is omitted. The RBUFCAP subfield indicates the amount of data units able to be received as a buffer.

When the value of the BAR Type is 6, 10, the BA Information field 1006 includes the Starting Sequence Control subfield 1010, a GCR Group Address subfield, and the Block Ack Bitmap subfield 1011. The Starting Sequence Control subfield 1010 and the Block Ack Bitmap subfield 1011 are as described above, and thus description thereof is omitted. The GCR Group Address subfield indicates the group address indicated by the BAR.

When the value of the BAR Type is 11, using the BA Information field 1006, the information of the BA of each connecting STA can be returned in the same frame using the BA Information field 1006. Specifically, for each STA, an AID TID Info subfield, the Starting Sequence Control subfield 1010, and the Block Ack Bitmap subfield 1011 are repeated. Since the AID TID Info subfield includes the AID subfield and the AID corresponding to the STA that connects to the AP is specified here, the STA can determine which BA is for which STA. 11 is used for the value of the BAR Type in cases in which the AP connects to a plurality of STAs and the AP having received a data frame from the plurality of STAs simultaneously sends a BA to the plurality of STAs. The Starting Sequence Control subfield 1010 and the Block Ack Bitmap subfield 1011 are as described above, and thus description thereof is omitted.

In this manner, by an appropriate sequence number being specified in the transmitting and receiving of data, the data receiving side can appropriately determine the initial value for the sequence number, allowing BA processing to proceed.

Figure 4A:
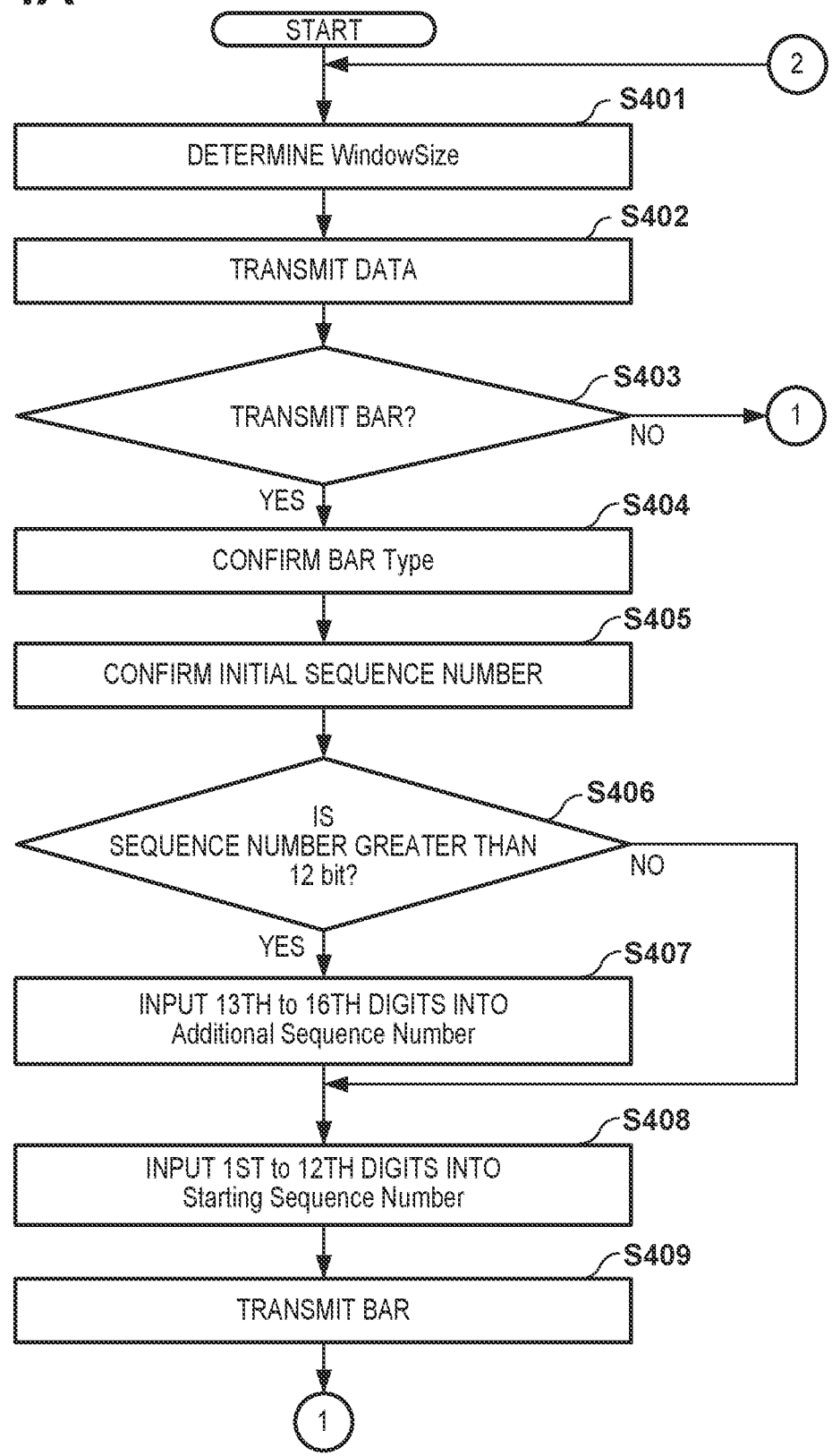
FIG. 4A is a diagram illustrating a flowchart (1) of the processing executed by an AP.
Figure 4B:
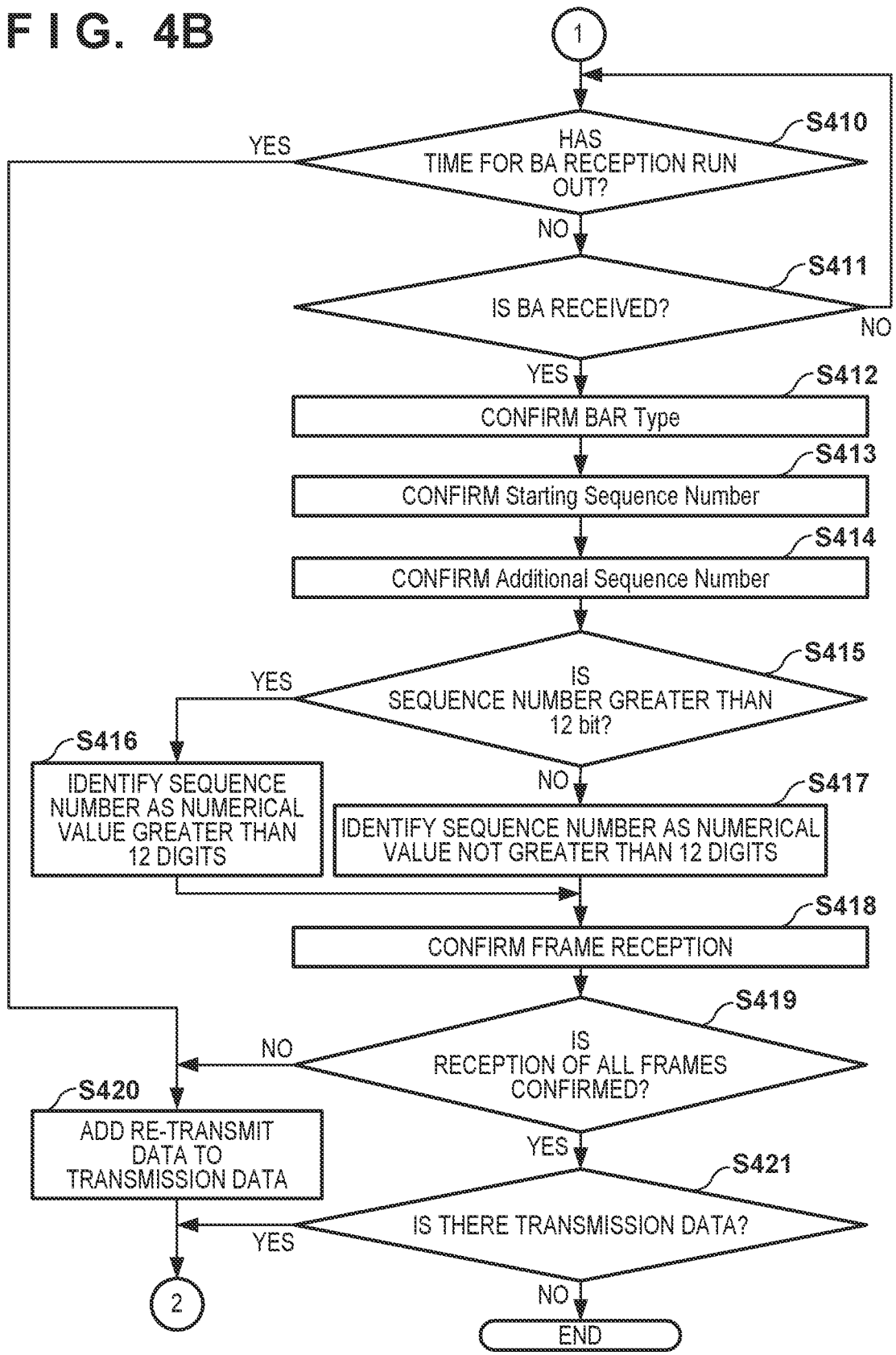
FIG. 4B is a diagram illustrating a flowchart (2) of the processing executed by an AP.

Next, the processing of the AP 102, which is the data transmitting side, from data transmission (F605) to BA reception (F609) will be described. FIGS. 4A and 4B are diagrams illustrating the flow of the processing executed by the AP 102. The flowchart illustrated in FIGS. 4A and 4B may be implemented by the control unit 202 of the AP 102 executing a control program stored in the storage unit 201 and calculation of information and processing and control of each piece of hardware being executed.

The processing illustrated in FIGS. 4A and 4B may be started when the AP 102 has completed preparations for data transmission. First, the wireless LAN control unit 301 of the AP 102 sets the WindowSize for determining the data size of data able to be transmitted at one time (step S401). The WindowSize may be set via a discretionary method, such as being set in advance by the AP 102, being input by a user via the input unit 204, or being set on the basis of the information received from the STA 103. Next, the wireless LAN control unit 301 transmits data to the STA 103 (step S402). As described in F605 of FIG. 6, upon data transmission, the wireless LAN control unit 301 also includes information indicating whether or not a BAR is required. The wireless LAN control unit 301 determines whether or not to transmit a BAR on the basis of the information (step S403). When a BAR is not to be transmitted (no in step S403), the wireless LAN control unit 301 waits as is to receive a BA from the STA 103 (steps S410 and S411). When a BAR is to be transmitted (yes in step S403), the BA control unit 303 confirms the BAR Type (step S404). Depending on the BAR Type, the BA format and processing method are different. In the present embodiment, the method of confirming the sequence number corresponds to a similar processing for all of the BAR Types.

After the BAR Type has been confirmed, the frame control unit 302 confirms the initial sequence number from the data units to be transmitted. When the initial sequence number is greater than 12 bit (yes in step S406), the frame control unit 302 inputs the 13th to 16th digits into the Additional Sequence Number subfield 912 (step S407) and inputs the 1st to 12th digits into the Starting Sequence Number subfield 913 (step S408). When the initial sequence number is less than 12 bit, the frame control unit 302 inputs a value only into the Starting Sequence Number subfield 913.

Note that in the BAR (BAR 900), when the field length of the Starting Sequence Number subfield 913 changes depending on the value of the BAR Type subfield 909 or the Fragment Number subfield, the processing of steps S406 to S408 is different. In this case, for example, the fields into which the sequence numbers are input may correspond to only the Starting Sequence Number subfield 913. Also, instead of the Additional Sequence Number subfield 912, the Fragment Number subfield may be set to 4 bit. Accordingly, it is no longer necessary to change the field into which the value is input depending on the number of digits of the sequence number. Thus, the processing on the frame receiving side can be simplified, and calculation costs can be reduced. Also, the existing BA processing can be changed without effects.

When the value of the BAR Type subfield 909 and the Starting Sequence Control subfield 911 is determined, the frame control unit 302 generates a BAR, and the wireless LAN control unit 301 performs BAR transmission (step S409). After the BAR has been transmitted, the wireless LAN control unit 301 waits a predetermined amount of time for the BA to be received (steps S410 and S411). If the time for BA reception runs out (a predetermined amount of time passes without the BA being received) (yes in step S410), the wireless LAN control unit 301 re-transmits the data (step S420) or ends the processing. When the wireless LAN control unit 301 has received a BA within the predetermined amount of time (no in step S410 and yes in step S411), the BA control unit 303 confirms the BAR Type of the received BA (step S412). When the BAR is transmitted in step S403, the BAR Type included in the received BA and the BAR Type included in the transmitted BAR include the same value.

Next, the frame control unit 302 confirms the Starting Sequence Number subfield 1013 (step S413) and confirms the Additional Sequence Number subfield 1012 (step S414). Next, the frame control unit 302 confirms whether the sequence number is greater than 12 bit from the values of the subfields confirmed in steps S413 and S414 (step S415). When the sequence number is greater than 13 digits (yes in step S415), the frame control unit 302 identifies the sequence number as a numerical value greater than 12 digits (step S416). When the sequence number is not greater than 12 digits (no in step S415), the frame control unit 302 identifies the sequence number as a numerical value less than 12 digits (step S417).

Note that when the field length of the Starting Sequence Number subfield 1013 changes depending on the value of the BAR Type subfield 1009 or the Fragment Number subfield of the Starting Sequence Control subfield 1010, the processing of steps S415 to S417 is different. In this case, the frame control unit 302 may confirm the sequence number itself in only the Starting Sequence Number subfield 1013. Also, instead of the Additional Sequence Number subfield 1012, the Fragment Number subfield may be set to 4 bit.

Next, the frame control unit 302 confirms the sequence number of the data unit received by the STA 103 using the identified sequence number as a starting point (step S418). When the frame control unit 302 confirms that all of the data units transmitted by the AP 102 have reached to STA 103 (yes in step S419), the frame control unit 302 confirms whether there is more data to transmit to the STA 103 (step S421). When there is still more data to transmit (yes in step S421), the processing returns to step S401 and the AP 102 again executes transmission processing. When there is no more data to transmit (no in step S421), the processing ends. In step S419, when the frame control unit 302 determines that there is a data unit that has not been received (no in step S419), re-transmit data of the unreceived data unit is added to the next data to be transmitted (step S420). Thereafter, the processing returns to step S401, and the AP 102 again executes data transmission processing.

Figure 5A:
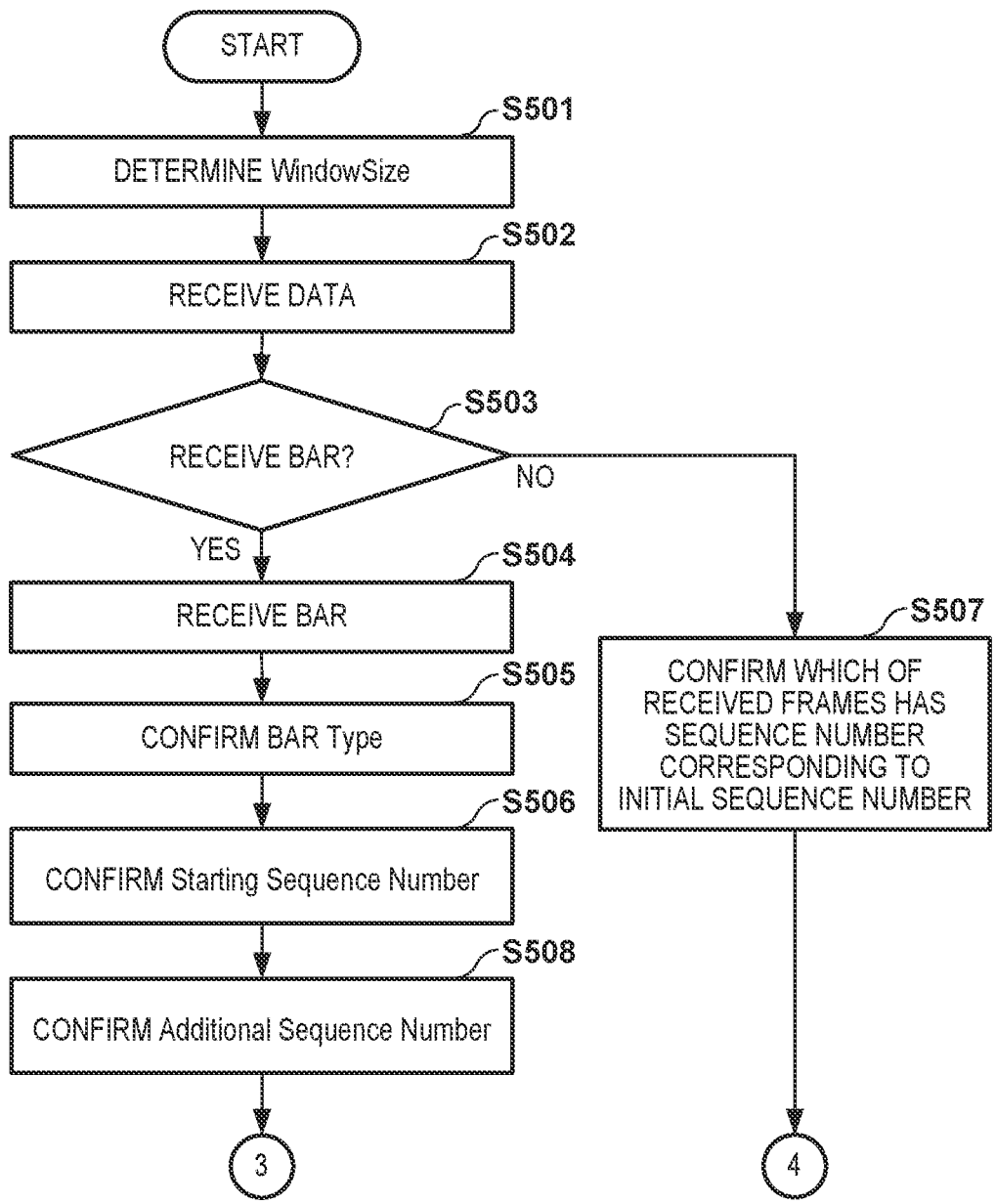
FIG. 5A is a diagram illustrating a flowchart (1) of the processing executed by an STA.
Figure 5B:
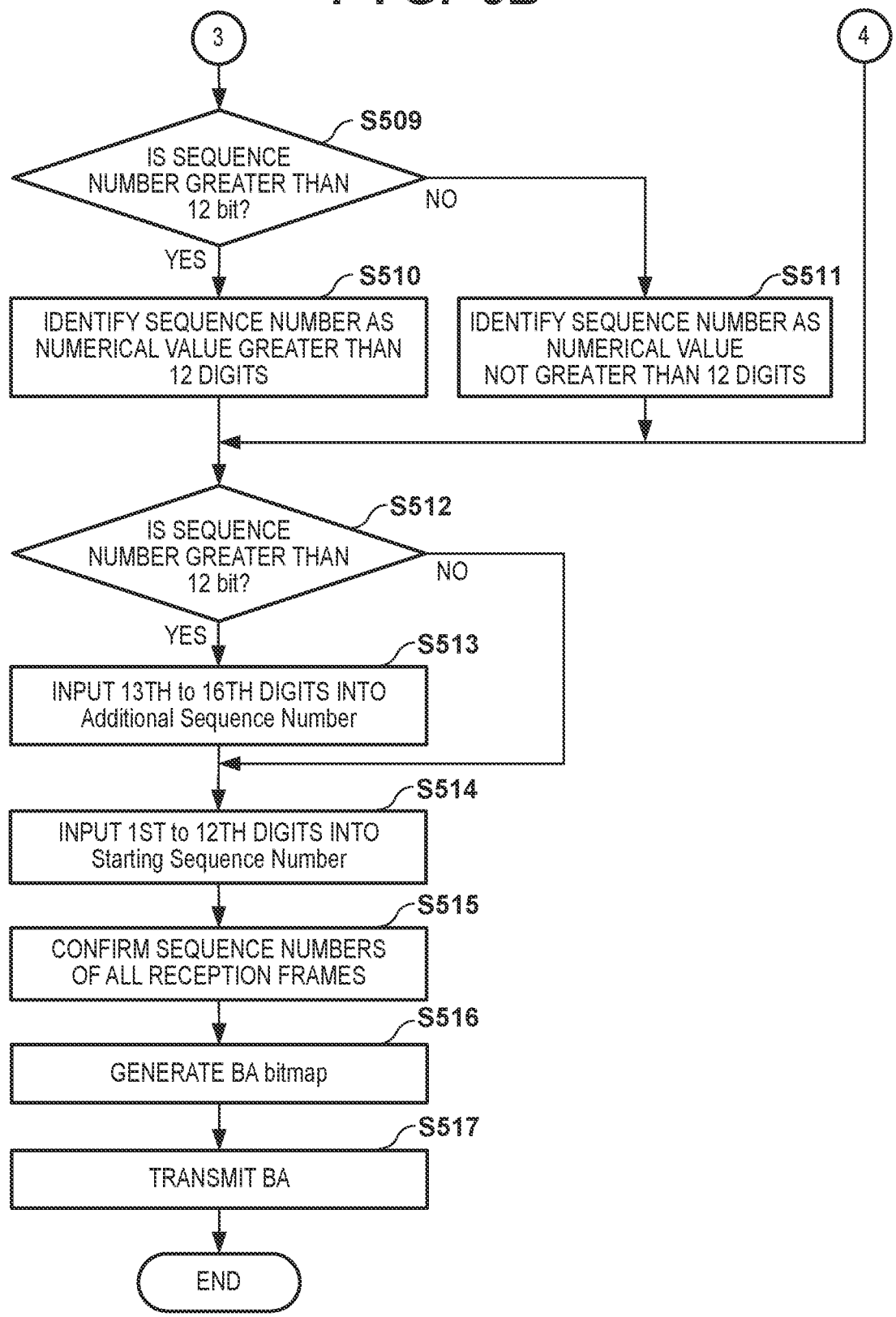
FIG. 5B is a diagram illustrating a flowchart (2) of the processing executed by an STA.

Next, the processing of the STA 103, which is the data receiving side, from data reception (F605) to BA transmission (F609) will be described. FIGS. 5A and 5B are diagrams illustrating the flow of the processing executed by the STA 103. The flowchart illustrated in FIGS. 5A and 5B may be implemented by the control unit 202 of the STA 103 executing a control program stored in the storage unit 201 and calculation of information and processing and control of each piece of hardware being executed.

The processing illustrated in FIGS. 5A and 5B may be started when the STA 103 has completed preparations for data reception. First, the wireless LAN control unit 301 of the STA 103 sets the WindowSize for determining the data size of data able to be transmitted at one time (step S501). The WindowSize may be set via a discretionary method, such as being set in advance by the STA 103, being input by a user via the input unit 204, or being set on the basis of the information received from the AP 102. Next, the wireless LAN control unit 301 receives data from the AP 102 (step S502). As described with reference to F605 of FIG. 6, the data includes information indicating whether or not a BAR is required. The wireless LAN control unit 301 determines whether or not to receive the BAR on the basis of the information (step S503). When the BAR is not to be received (no in step S503), the wireless LAN control unit 301 confirms which of the received frames has the sequence number corresponding to the initial sequence number (step S507) and transitions to sequence number input processing (step S512). When the BAR is to be received (yes in step S503), the wireless LAN control unit 301 waits for BAR reception (step S504). When the BAR has been received, the BA control unit 303 confirms the BAR Type (step S505). Depending on the BAR Type, the BA format and processing method are different. In the present embodiment, the method of confirming the sequence number corresponds to a similar processing for all of the BAR Types.

After confirmation of the BAR Type, the frame control unit 302 confirms the Starting Sequence Number subfield 913 of the BAR (step S506) and confirms the Additional Sequence Number subfield 912 (step S508). Accordingly, for the received data units, the sequence number corresponding to the initial sequence number is confirmed. When the sequence number is greater than 12 bit, the sequence numbers are identified as the 13th to 15th digits for the Additional Sequence Number subfield 912 and the 1st to 12th digits into the Starting Sequence Number subfield 913 (step S510). When the sequence number is less than 12 bit, the value of only the Starting Sequence Number subfield 913 is confirmed (step S511).

Note that when the field length of the Starting Sequence Number subfield 913 changes depending on the value of the BAR Type subfield or the Fragment Number subfield, the processing of steps S509 to S511 is different. In this case, the sequence numbers that are confirmed may only be those of the Starting Sequence Number subfield 913. Also, instead of the Additional Sequence Number subfield 912, the Fragment Number subfield may be set to 4 bit.

When the sequence number of the data unit to be initially received has been confirmed, the frame control unit 302 sets the value of the Starting Sequence Control subfield 1010 indicated in the BA. When a BAR has been received, this value is input unchanged. When a BAR has not been received, the sequence number of the data unit to be initially received from among the received frames is input. Note that even when a BAR has been received, the initial sequence number from among the data units correctly received by the STA 103 may be input. Next, the frame control unit 302 confirms whether or not the initial sequence number is greater than 12 bit (step S512). When the initial sequence number is greater than 12 bit (yes in step S512), the frame control unit 302 inputs the 13th to 16th digits into the Additional Sequence Number subfield 1012 (step S513) and inputs the 1st to 12th digits into the Starting Sequence Number subfield 1013 (step S514). When the initial sequence number is not greater than 12 bit (No in step S512), the frame control unit 302 inputs the 1st to 12th digits into the Starting Sequence Number subfield 1013 (step S514).

Note that when the field length of the Starting Sequence Number subfield 1013 changes depending on the value of the BAR Type subfield or the Fragment Number subfield, the processing of steps S512 to S514 is different. In this case, input may be performed into the Starting Sequence Number subfield 1013. Also, instead of the Additional Sequence Number subfield 1012, the Fragment Number subfield may be set to 4 bit. Accordingly, it is no longer necessary to change the field into which the value is input depending on the number of digits of the sequence number. Thus, the processing on the frame receiving side can be simplified, and calculation costs can be reduced. Also, the existing BA processing can be changed without effects.

The bitmap control unit 304 confirms what has been correctly received using the sequence numbers of the data units starting with the sequence number (step S515). The bitmap control unit 304 sets the value of the Block Ack Bitmap subfield corresponding to the sequence number of the data unit correctly received to 1. For example, when the initial sequence number is 3 and the sequence number of correctly received data units is 3, 5, 6, the 1st, 3rd, and 4th bit are set to 1. When the values to input into the BAR Type subfield 1009, the Starting Sequence Control subfield 1010, and the Block Ack Bitmap subfield 1011 are determined (step S516), the frame control unit 302 generates a BA, and the wireless LAN control unit 301 transmits a BA and ends the processing (step S517).

Accordingly, even when the number of characters allocated to the sequence number is increased, data transmission from the AP 102 to the STA 103 and confirmation thereof are performed.

MODIFIED EXAMPLES

In the example described above, data is transmitted from the AP 102 to the STA 103. But no such limitation is intended. For example, data may be transmitted from the STA 103 to the AP 102. Also, a configuration in which the AP 102 and the STA 103 support a plurality of links and a common sequence number is used by the plurality of links may be used. In this manner, the throughput may plausibly be further improved. Also, the ADDBA Request, the ADDBA Response, the BAR, and the BA as per the embodiment described above may be applied when the AP 102 connects to a plurality of STAs and simultaneously receives data frames from the STAs. In this manner, since the plurality of STAs simultaneously transmit frames, efficient radio wave transmitting and receiving can be achieved even when a large amount of data is being transmitted. Also, after the processing of the ADDBA Request and the ADDBA Response, either DELBA processing can be executed or both data transmitting and receiving can be repeatedly performed until the connection is cut. This also applies even when the BAR Type changes during data communication. In this manner, even when the type of data to be transmitted from the AP 102 to the STA 103 changes from unicast to multicast, data transmitting and receiving can continue without again executing the ADDBA processing, and processing overhead can be reduced.

In the embodiment described above, the Additional Sequence Number subfield 716 is defined as a Fragment Number subfield with a 4-bit length prior to IEEE 802.11ax. However, no such limitation is intended. For example, in the BAR, BA, ADDBA Request, and ADDBA Response, 1 byte may follow on from the end of the Starting Sequence Control subfield. In other words, the 1 byte after the Starting Sequence Control subfield may be used to indicate the initial sequence number. In this case, the GCR Group Address element, Multi-band, TCLAS, or ADDBA Extension may follow on from the end, but they may be attached to the front or back.

Also, in the ADDBA Request, the Additional Sequence Number subfield 716 may be defined as one element of the ADDBA Extension element. In a similar manner, in the BAR and BA, an Additional Sequence Number subfield may be placed after the Starting Sequence Control subfield or after the Block Ack Bitmap subfield. Also, an Extension element may be defined after the Block Ack Bitmap subfield, with an ID indicating the Additional Sequence Number, the length, and a value of the Additional Sequence Number being indicated here. Accordingly, the number of numbers able to represent the sequence number can be increased without changing the existing format of the field.

In this manner, even when the maximum value of the sequence number is increased, a BAR or BA can be transmitted to the partner apparatus with the initial sequence number of the data unit (data frame) relating to the transmission being represented. Note that the language 'subfield' and 'field' used in the examples described above are conventional terms, and subfields may be referred to as fields. For example, Starting Sequence Number field, Block Ack Action field, BAR Type field, and the like may be used.

According to the present invention, a region for sequence numbers indicated by frames for controlling a Block Ack (BA) is expanded.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus that operates in accordance with an IEEE 802.11 series standard, comprising:
at least one processor; and
at least a memory coupled to the at least one processor and having instructions stored thereon, and when executed by the at least one processor, causing the at least one processor to:
transmit a first plurality of data frames each including a data unit to a first other communication apparatus a first plurality of times continuously;
generate a first Block Ack Request (BAR) frame;
transmit the first BAR frame to the first other communication apparatus after transmission of the first plurality of data frames the first plurality of times continuously; and
receive a first Block Ack (BA) frame as a response to the BAR frame from the first other communication apparatus,
wherein the first BAR frame indicates a sequence number for a data unit in an initial data frame, from among the first plurality of data frames transmitted the first plurality of times continuously, using a first predetermined field in the first BAR frame, and wherein the first predetermined field includes a Fragment Number field and a Starting Sequence Number field in the first BAR frame, wherein a number of digits of the Starting Sequence Number field changes depending on a value indicated by the Fragment Number field, and in a case where the 1st to 4th bits of the Fragment Number field are other than 1, 0, 0, 0, the Fragment Number field indicates that the number of digits of the Starting Sequence Number field is set to 12 digits, and in a case where a 1st bit of the Fragment Number field is 1 and a 2nd to 4th bits are 0, the Fragment Number field indicates that the number of digits of the Starting Sequence Number field is set to 16 digits, wherein the 16 digits of the Starting Sequence Number field includes the 12 digits of the Starting Sequence Number field before extended and 4 digits of additional field which is different from the Fragment Number field, and the 16 digits of the Starting Sequence Number field follows the 4 digits of Fragment Number field in the first BAR frame.

2. A control method for a communication apparatus that operates in accordance with an IEEE 802.11 series standard, comprising:

transmitting data frames each including a data unit to an other communication apparatus a plurality of times continuously;

generating a Block Ack Request (BAR) frame;

transmitting the BAR frame to the other communication apparatus after transmission of the data frames the plurality of times continuously; and receiving a Block Ack (BA) frame as a response to the BAR frame from the other communication apparatus, wherein in the generating, a sequence number for a data unit in an initial data frame, from among the data frames transmitted the plurality of times continuously, is indicated using a predetermined field in the BAR frame, and the predetermined field includes a Fragment Number field and a Starting Sequence Number field in the BAR frame, wherein a number of digits of the Starting Sequence Number field changes depending on a value indicated by the Fragment Number field, and in a case where the 1st to 4th bits of the Fragment Number field are other than 1, 0, 0, 0, the Fragment Number field indicates that the number of digits of the Starting Sequence Number field is set to 12 digits, and wherein in a case where a 1st bit of the Fragment Number field is 1 and a 2nd to 4th bits are 0, the Fragment Number field indicates that the number of digits of the Starting Sequence Number field is set to 16 digits, wherein the 16 digits of the Starting Sequence Number field includes the 12 digits of the Starting Sequence Number field before extended and 4 digits of additional field which is different from the Fragment Number field, and the 16 digits of the Starting Sequence Number field follows the 4 digits of Fragment Number field in the first BAR frame.

3. A non-transitory computer-readable storage medium storing a program for causing a computer to execute a control method for a communication apparatus that operates in accordance with an IEEE 802.11 series standard characterized by comprising:

transmitting data frames each including a data unit to an other communication apparatus a plurality of times continuously;

generating a Block Ack Request (BAR) frame;

transmitting the BAR frame to the other communication apparatus after transmission of the data frames the plurality of times continuously; and receiving a Block Ack (BA) frame as a response to the BAR frame from the other communication apparatus, wherein in the generating, a sequence number for a data unit in an initial data frame, from among the data frames transmitted the plurality of times continuously, is indicated using a predetermined field in the BAR frame, and the predetermined field includes a Fragment Number field and a Starting Sequence Number field in the BAR frame, wherein a number of digits of the Starting Sequence Number field changes depending on a value indicated by the Fragment Number field, and in a case where the 1st to 4th bits of the Fragment Number field are other than 1, 0, 0, 0, the Fragment Number field indicates that the number of digits of the Starting Sequence Number field is set to 12 digits, and wherein in a case where a 1st bit of the Fragment Number field is 1 and a 2nd to 4th bits are 0, the Fragment Number field indicates that the number of digits of the Starting Sequence Number field is set to 16 digits, wherein the 16 digits of the Starting Sequence Number field includes the 12 digits of the Starting Sequence Number field before extended and 4 digits of additional field which is different from the Fragment Number field, and the 16 digits of the Starting Sequence Number field follows the 4 digits of Fragment Number field in the first BAR frame.

* * * * *